United States Patent [19]

Seelen

[11] Patent Number: 4,924,817
[45] Date of Patent: May 15, 1990

[54] SEAL FOR BLAST PIPE OR SHAFT

[76] Inventor: Josef Seelen, Mittelstrasse 14, D-4232 Xanten 1, Fed. Rep. of Germany

[21] Appl. No.: 320,280

[22] Filed: Mar. 6, 1989

[30] Foreign Application Priority Data

Apr. 15, 1988 [DE] Fed. Rep. of Germany ....... 3812533

[51] Int. Cl.$^5$ .......................... F22B 37/18; F22B 37/48
[52] U.S. Cl. ...................................... 122/379; 15/317; 122/390; 165/95; 277/96; 277/DIG. 8
[58] Field of Search ................... 277/96, 96.2, DIG. 8; 165/95; 122/379, 391, 392, 390; 15/317

[56] References Cited

U.S. PATENT DOCUMENTS

| | | | |
|---|---|---|---|
| 4,093,242 | 6/1978 | Terry | 122/392 X |
| 4,452,183 | 6/1984 | Yazidjian | 122/392 |
| 4,750,548 | 6/1988 | Albers et al. | 122/379 X |

FOREIGN PATENT DOCUMENTS

| | | |
|---|---|---|
| 0263238 | 6/1987 | European Pat. Off. . |
| 2212165 | 3/1972 | Fed. Rep. of Germany . |
| 2643769 | 9/1976 | Fed. Rep. of Germany . |
| 3507943 | 3/1988 | Fed. Rep. of Germany . |
| 448647 | 4/1968 | Switzerland . |
| 2198195 | 6/1988 | United Kingdom . |

Primary Examiner—Edward G. Favors

[57] ABSTRACT

The invention relates to a seal for the shaft of a flue gas flap or the blast pipe of a soot blower for boilers or industrial furnaces subjected to excess pressure, having a shaft or pipe which is enclosed by at least two corotating coaxial sealing rings bounding between themselves an annular chamber for the supply of barrier air and each bearing on the inside metal bristles which bear against the shaft or blowing pipe and are arranged in at least two groups of brushes disposed in a circle one beside the other, an annular coaxial gap being left between the two annular groups of brushes of each sealing ring, such gap opening in the direction of the shaft or blowing pipe and being acted upon with barrier air.

5 Claims, 1 Drawing Sheet

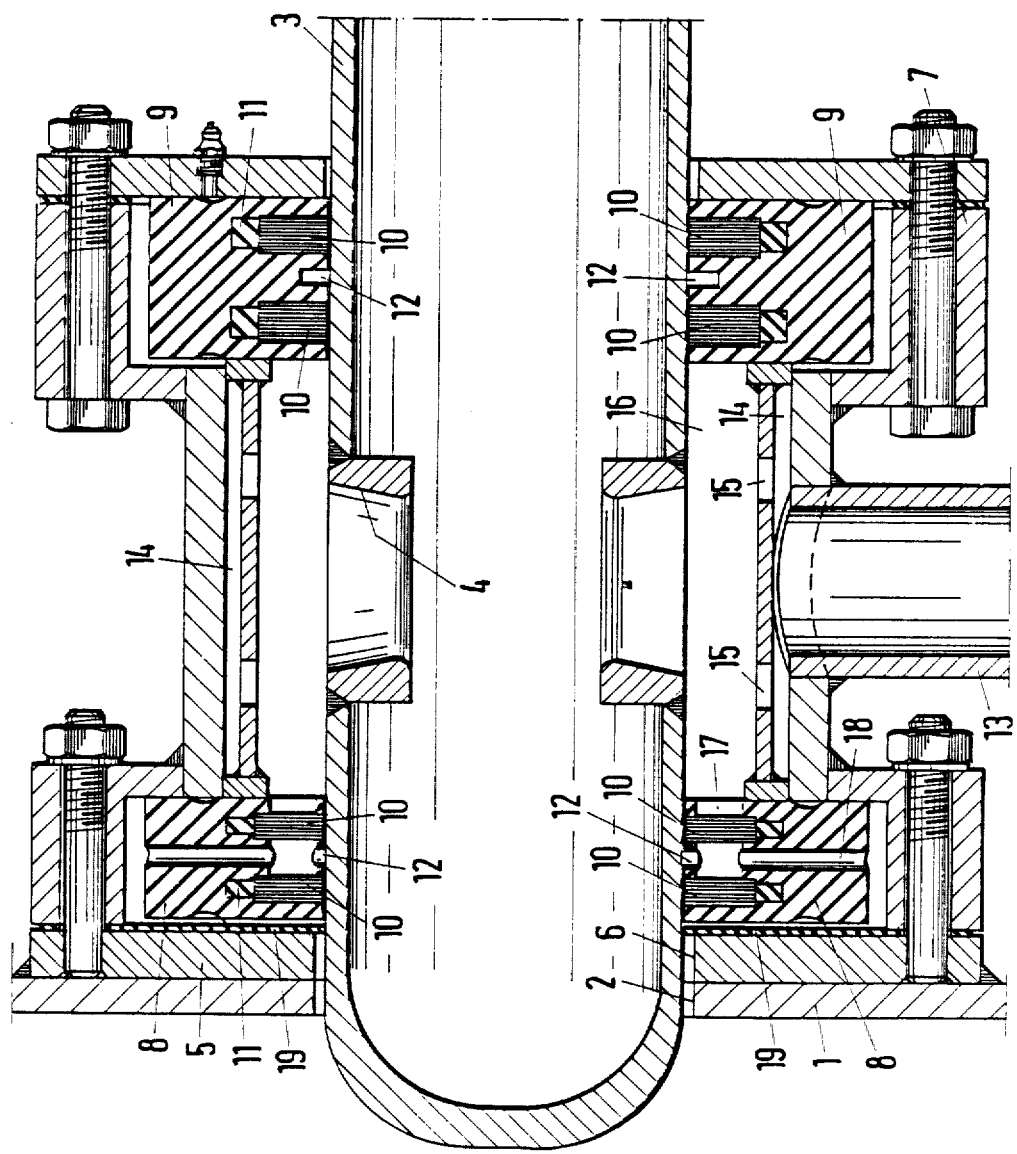

SEAL FOR BLAST PIPE OR SHAFT

The invention relates to a seal for the shaft of a flue gas flap or the blast pipe of a soot blower for boilers or industrial furnaces subjected to excess pressure, having a shaft or pipe which is enclosed by at least two corotating coaxial sealing rings bounding between themselves an annular chamber for the supply of barrier air and each bearing on the inside metal bristles which bear against the shaft or blowing pipe and are arranged in at least two groups of brushes disposed in a circle one beside the other.

A seal for soot blowers of the kind specified is known from German OS 3310857. This prior art seal has high density and requires substantially no maintenance, but it has been found in practice that the flue gas in the boiler can emerge to the outside through the seals.

It is an object of the invention to improve a seal of the kind specified to achieve a high density seal.

To this end according to the invention disposed between the two annular groups of bushes of each sealing ring is an annular coaxial gap which opens in the direction of the shaft or blast pipe and is acted upon with barrier air.

As a result of such a construction, each sealing ring itself forms a coaxial annular gap and therefore with, for example, only two sealing rings a total of three annular gaps is provided which are acted upon with barrier air. This makes it absolutely impossible for flue gas in the zone of the blowing lance to penetrate to the outside. Moreover, no maintenance is required and the construction itself is of a very simple nature.

Particularly advantageously, more than two groups of brushes are attached to each of the sealing rings, an annular coaxial gap with barrier air being left between each pair of groups of brushes disposed one beside the other. The gap can also be an annular groove.

Particularly advantageously the sealing ring disosed at a greater distance from the boiler or industrial furnaces has a greater density and/or number of bristles. As a result, the sealing ring disposed at a far distance has a higher resistance and therefore provides a stronger seal, so that the barrier air present between the sealing ring and the boiler flows into the boiler, not to the outside.

An embodiment of the invention is shown in axial section in the drawing and will now be described in greater detail.

The boiler wall 1 of an industrial furnace is formed with a circular aperture 2 through which a cylindrical blowing lance 3 can be inserted from outside whose diameter is only slightly smaller than that of the aperture 2. The blowing lance is formed with lateral apertures 4 through which hot steam can be forced to clean the boiler or industrial furnace, the blowing lance 3 being rotated around its longitudinal axis as it is inserted.

Coaxially welded to the outside of the boiler wall 1 around the aperture 2 is an annular plate 5 formed with an aperture 6 matching the aperture 2. Screwed to the outside of the annular plate 5 is a casing 7 in which the sealing means for the blowing lance 3 are mounted. The sealing means comprise two sealing rings 8, 9 which enclose the blowing lance 3 coaxially and are rotatably mounted in the casing 7, so that they are entrained by the rotation of the blowing lance 3.

Projecting from the inner periphery of each sealing ring 8, 9 are brushes which form groups of brushes 10 disposed in a circle. The radially inwardly directed bristles of the brushes are attached to annular supports 11 and bear via their free ends against the outer periphery of the blowing lance 3. The supports 11 are let into the sealing rings 8, 9.

Disposed between the two groups of brushes 10 of each sealing ring 8, 9 is an annular coaxial gap 12 which opens in the direction of the blowing lance surface and is acted upon with barrier air. The barrier air is supplied through a pipe spigot 13 which is attached to the outside of the casing between the two sealing rings 8, 9. From the spigot 3 the barrier air passes into an outer annular chamber 14 and thence via apertures 15 into an inner annular chamber 16 acting as a sealing space. The annular chamber 16 is bounded laterally by the sealing rings 8, 9, which are formed with lateral passages 17 or connecting bores which extend to the annular gaps 12 which they supply with barrier air.

Extending radially outwards from the apertures 17 are bores 18 which act upon the outsides of the sealing rings 8, 9.

Attached between the sealing ring 8 and the annular plate 5 is a front sealing disc 19 which bears via its aperture against the outside of the blowing lance 3 to provide a further seal. The sealing ring 9 disposed at greater distance from the boiler wall 1 is constructed wider and has wider and denser rings of bristles 10, so that a heavier density is achieved than with the sealing ring 8 and therefore a higher air resistance.

This device can be used to seal in a similar manner not only a blast pipe, but also a shaft, more particularly the shaft of a flue gas flap.

I claim:

1. A seal for a shaft of a flue gas flap or a blast pipe of a soot blower for boilers or industrial furnaces subjected to excess pressure, said seal comprising:
   a shaft or pipe;
   at least two corotating coaxial sealing rings enclosing said shaft or pipe;
   an annular chamber for supplying barrier air bounded by said sealing rings;
   inside metal bristles bearing against said shaft or pipe and being contacted by said sealing rings, said bristles being arranged to form at least two brushes disposed in a circle one beside the other; and
   an annular coaxial gap disposed between said two brushes, opening in a direction of said shaft or pipe, and being acted upon by said barrier air.

2. A seal according to claim 1, wherein the sealing ring disposed at a greater distance from the boiler or industrial furnace has a greater number of bristles.

3. A seal according to claim 1, wherein more than two brushes are attached to each of the sealing rings, an annular coaxial gap with barrier air being left between each pair of brushes disposed one beside the other.

4. A seal according to claim 1, wherein the gap is an annular groove.

5. A seal according to claim 1, wherein the sealing ring disposed at a greater distance from the boiler or industrial furnace has a greater density.